United States Patent [19]

Hore et al.

[11] Patent Number: 5,637,997

[45] Date of Patent: Jun. 10, 1997

[54] ANGULAR DISPLACEMENT SENSOR WITH MOVABLE INDUCTANCE AFFECTING COMPONENT

[75] Inventors: Donald L. Hore, Bristol; Robert A. Slade, Rochester, both of Great Britain

[73] Assignee: Radiodetection Limited, Bristol, England

[21] Appl. No.: 232,270

[22] PCT Filed: Nov. 4, 1992

[86] PCT No.: PCT/GB92/02034

§ 371 Date: May 5, 1994

§ 102(e) Date: May 5, 1994

[87] PCT Pub. No.: WO93/09402

PCT Pub. Date: May 13, 1993

[30] Foreign Application Priority Data

Nov. 7, 1991 [GB] United Kingdom ............ 9123633

[51] Int. Cl.⁶ .................. G01B 7/14; G01B 7/30
[52] U.S. Cl. .................. 324/207.16; 324/207.25; 336/79
[58] Field of Search .............. 324/207.16, 207.24, 324/207.15, 207.19, 207.23, 262, 207.25, 207.26, 207.17, 207.18, 207.22; 340/870.31–870.36; 336/118, 135, 30, 130, 79, 45

[56] References Cited

U.S. PATENT DOCUMENTS

| | | | |
|---|---|---|---|
| 3,045,227 | 7/1962 | Minas | 336/130 |
| 4,398,419 | 8/1983 | Iwasaki | 324/207.25 |
| 4,507,638 | 3/1985 | Brosh | 336/79 |
| 5,025,213 | 6/1991 | Dobler et al. | 324/207.12 |
| 5,109,193 | 4/1992 | Pike | 324/207.25 |
| 5,126,665 | 6/1992 | Hachtel et al. | 324/207.19 |
| 5,175,497 | 12/1992 | Dobler et al. | 324/207.25 |
| 5,214,378 | 5/1993 | Hore | 324/207.16 |

FOREIGN PATENT DOCUMENTS

| | | |
|---|---|---|
| 0049987 | 4/1982 | European Pat. Off. . |
| 0460417 | 11/1991 | European Pat. Off. . |
| 2301483 | 7/1974 | Germany . |
| 4102478 | 5/1991 | Germany . |

*Primary Examiner*—Sandra L. O'Shea
*Assistant Examiner*—Jay M. Patidar
*Attorney, Agent, or Firm*—Larson and Taylor

[57] ABSTRACT

An angular displacement sensor for limited angle applications (e.g., for sensing automotive throttle positions) comprising first (14) and second (16) relatively rotatable components arranged to confront each other axially. The first component (14) provides a plurality of poles (14A, B, C) which are angularly disposed about the rotation axis and extend towards the second component. These poles (14A, B, C) have axes which extend in the same direction as the rotation axis. Some poles have windings (14A, B), while others (14B) provide flux return paths. The second component comprises an inductance affecting component (16) which overlies only some of the wound poles at any given time, the relative rotation varying the poles which are overlaid. The sensor includes an output unit (17) for providing output signal data related to the inductances of the excitation poles and thus related to the rotary configuration of the components.

8 Claims, 8 Drawing Sheets

VIEW ON XX

VIEW ON XX

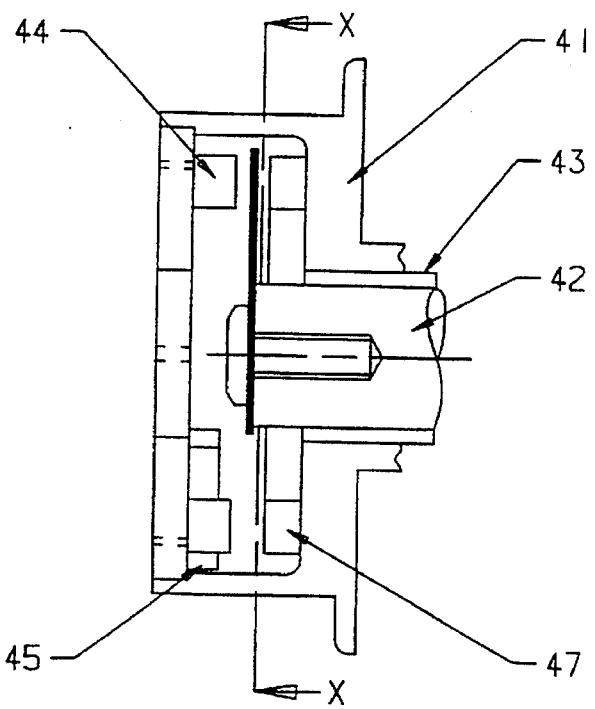
FIG.4A
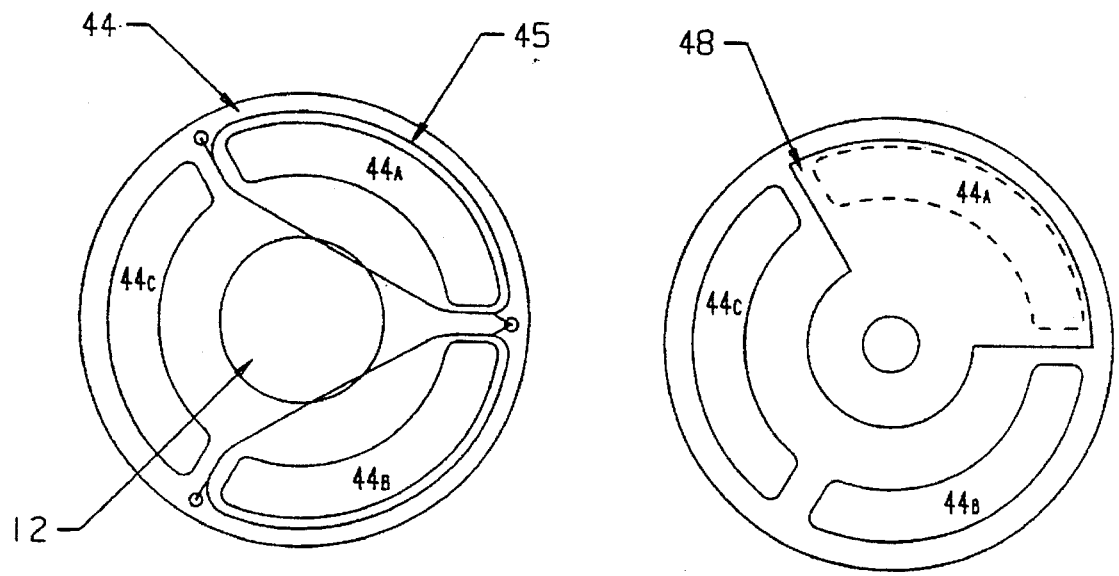
FIG.4B
VIEW ON XX
FIG.4C

ANGULAR DISPLACEMENT SENSOR WITH MOVABLE INDUCTANCE AFFECTING COMPONENT

This application is a continuation of International application Ser. No. PCT/BG92/02034, filed on Nov. 4, 1992.

TECHNICAL FIELD

This invention relates to devices comprising angular displacement sensors.

BACKGROUND ART

Inductive brushless angle sensing principles are described in our patent specifications WO88/06716 and WO90/04152. The present invention concerns their adaptation to provide angle sensing means suitable for use within a device such as a torque motor or vehicle throttle actuator, preferably requiring little or no extension to the housings of such mechanisms.

There are many applications in motion control systems in which shaft angle must be accurately measured and electrically transmitted. Embodiments of the invention may enable one to achieve this with utmost economy in manufacturing cost and space envelope.

DISCLOSURE OF THE INVENTION

The invention provides an angular displacement sensor, particularly for a restricted angular range (which generally means substantially less than 360°, and usually 180° or less, particularly 120° or less. The sensor comprises first and second relatively rotatable components. (These will generally be a rotor for coupling to a rotatable element of a device such as a shaft, and a stator for coupling to a housing of the device). These components confront one another axially. One provides a plurality of axially extending poles arranged around at least part of a circle, suitably provided by an annular projection having gaps dividing it into discrete poles. Some (only) of the poles bear winding coils. Preferably a ferromagnetic element is axially adjacent the poles. In one type of embodiment it is shaped to overly only some of the poles and is provided by the second relatively rotatable component. In a second type of embodiment the ferromagnetic element (if present) may be fixed relative to the first component but, interposed between the element and the first component there is a screening element of non-magnetic conducting material which is rotatable relative to the first component and is shaped to overlie only some of the poles. In a further embodiment, the rotatable element may comprise a combination of ferromagnetic coupling and non-magnetic screening materials. In all cases, relative rotation leads to variation in inductance of the individual poles. By applying alternating voltages across them and detecting voltage drops, one can derive electrical output data related to angular displacement. The data can be processed and the results displayed in ways that will be apparent to the skilled reader.

The axial construction enables simple, compact sensors to be produced, highly suitable for incorporation in rotary devices such as automotive throttle position sensors and torque motors. In another aspect the invention provides a rotary device having a housing, a rotatable shaft extending within the housing, and an angular displacement sensor of the above type mounted at least partly within the housing, with one of said relatively rotatable components rotationally coupled to the shaft.

The poles may be connected as a homopolar or heteropolar array.

Some embodiments of the invention will now be described with reference to the accompanying drawings.

BRIEF DESCRIPTION OF THE DRAWINGS

FIG. 1A is an axial section; FIG. 1B is a view of the stator of the sensor showing the poles and their windings; FIG. 1C is a section on X—X in FIG. 1A; and FIG. 1D is a schematic representation of the sensor;

FIG. 3F shows a graph analogous to that of FIG. 2 for the alternative connections of FIGS. 3C and 3D; FIG. 3G shows a graph analogous to that of FIG. 2 for the alternative connection of FIG. 3E;

FIGS. 4A to 4C show a third embodiment related to that of FIG. 1, and FIGS. 4A, B and C correspond to FIGS. 1A, B and C respectively;

MODES FOR CARRYING OUT THE INVENTION

FIG. 1 shows a typical embodiment mounted to a device such as an actuator having a housing 10. The device has a shaft 12 which is carried by a journal bearing 13. A sensor stator 14 of ferromagnetic material such as a ferrite or ferroplastic is located concentric with the shaft 12 in a tubular extension 11' of the housing 10 which, if of metal such as aluminium, will provide electromagnetic shielding of the sensor.

Figure 1A:
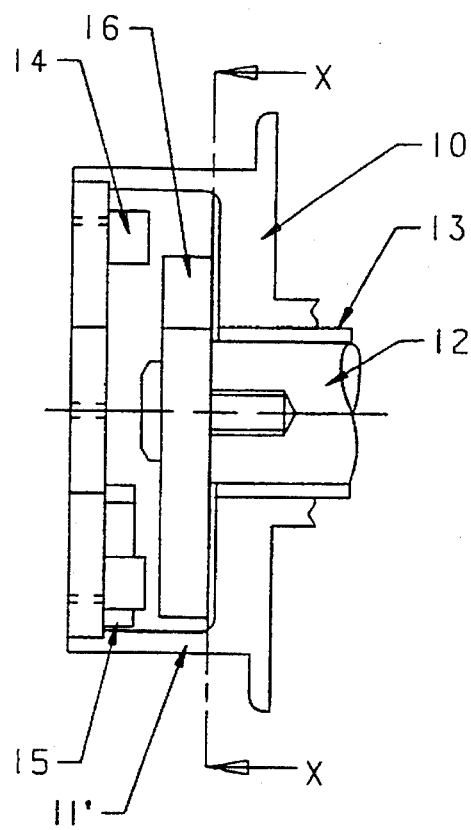
FIGS. 1A–D shows a first embodiment mounted to a rotary device such as an actuator.
Figure 1B:
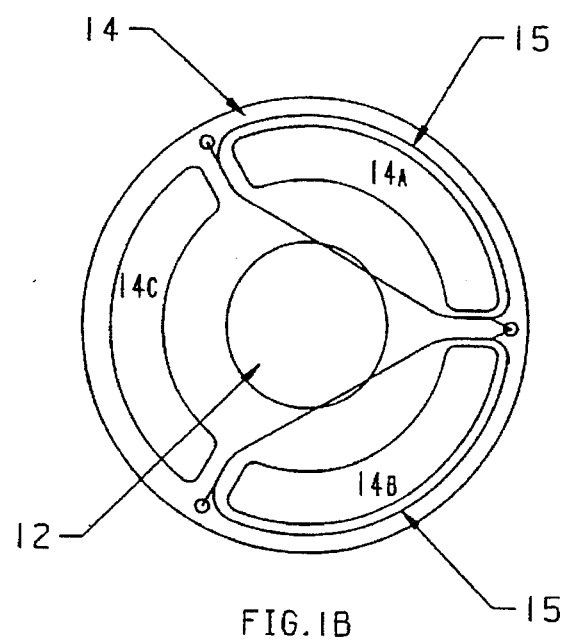
Figure 1C:
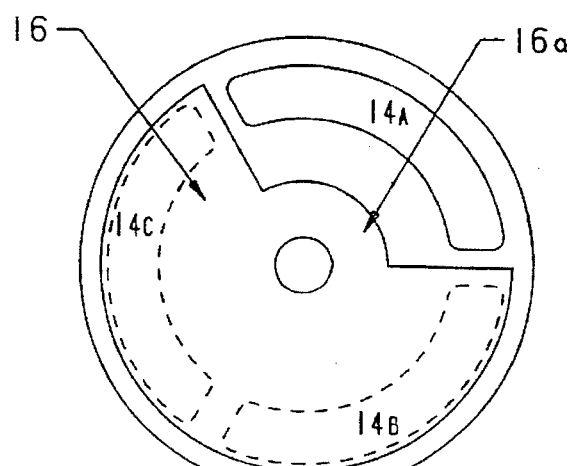
Figure 1D:
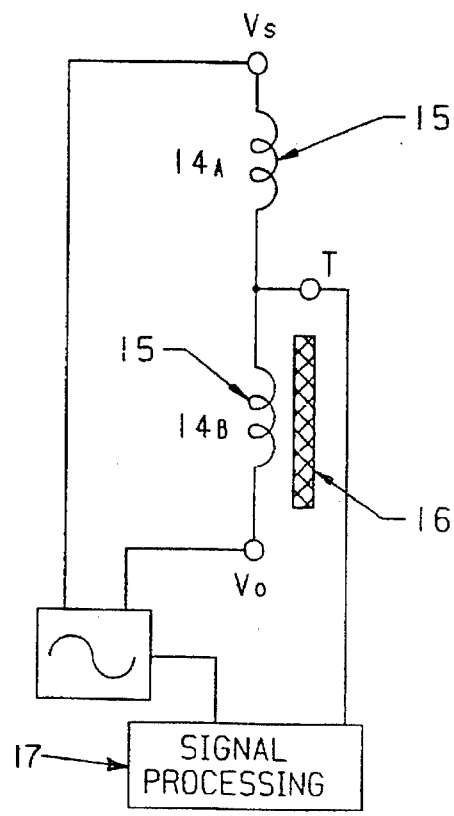

The axially inner surface of the stator 14 has an annular projection divided into three poles 14A, 14B and 14C, in this case of equal 120° span. Two of these (14A and 14B) carry coils 15 which are connected in series as shown in FIG. 1D to an a.c. supply Vs-Vo, an intermediate connection being brought out to a tap T.

Figure 2:
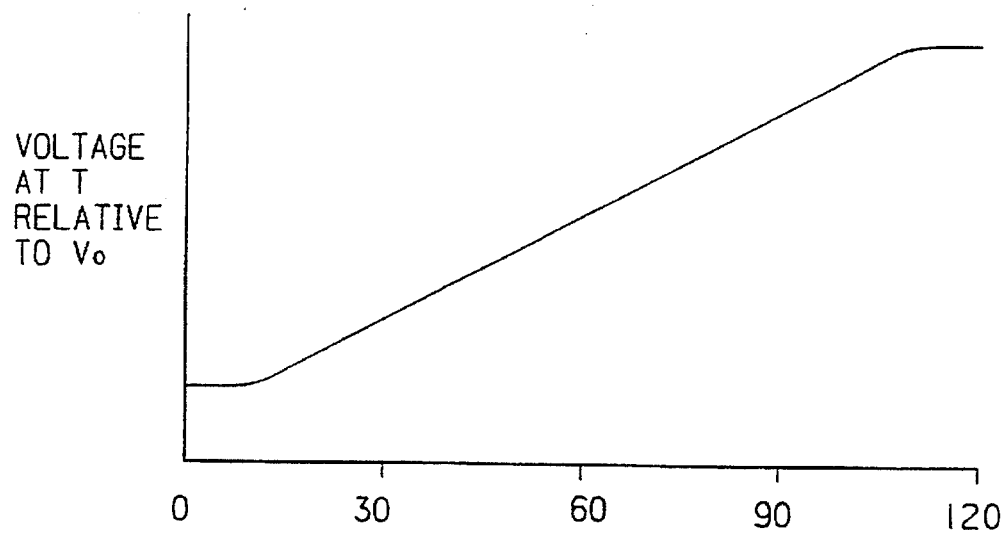
FIG. 2 is a graph showing the relationship between the angular position of a rotor of a sensor and an output voltage for an embodiment such as that of FIG. 1.

A rotor 16 is attached to the end of the shaft 12 by a screw or other suitable means, positioned so that it rotates close to the pole surfaces of the stator 14. Rotor 16 is an incomplete disc, having a 120° sector missing, except in the central hub portion 16a. Like the stator 14, it is of ferromagnetic material, so that it provides flux coupling between the stator poles, except for the 120° cutaway portion, shown exposing pole 14A. This therefore allows flux developed by the winding of pole 14B to pass freely through the high permeability path provided by the rotor and return to the unwound pole 14C, while flux developed in pole 14A has only a low permeability leakage path through air. The inductance of the winding at pole 14A will therefore be lower than that of pole 14B, so that the highest volt drop will be across the winding of pole 14B to centre tap T. Rotating the rotor by 120° clockwise will progressively transfer high inductance and volt-drop to pole 14A. The voltage between tap T and terminal Vo will then rise and fall as an analogue of shaft angle, as explained in the referenced patent applications, over a range of 120° (FIG. 2). Signal processing means 17 receive the voltage signals and provide an output signal indicative of angular displacement.

Figure 3A:
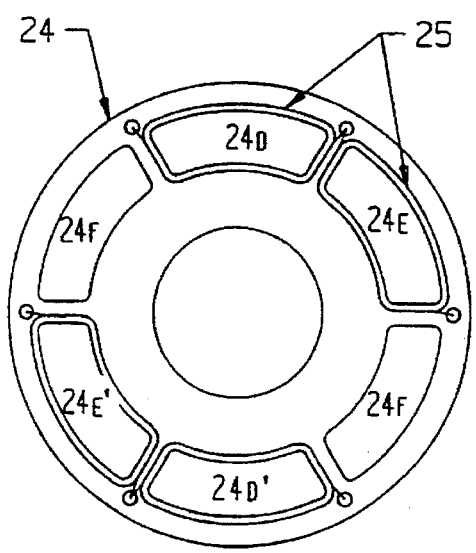
FIGS. 3A to 3G illustrate a second embodiment of sensor, FIGS. 3A and 3B being views equivalent to FIGS. 1B and 1C respectively, while FIGS. 3C, 3D and 3E correspond to FIG. 1D and show alternative modes of connection.
Figure 3B:
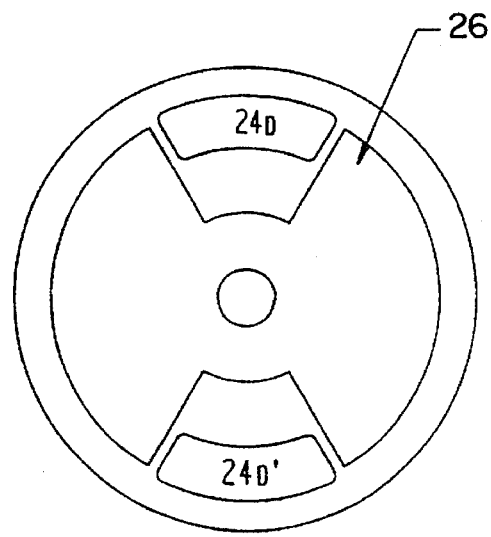
Figure 3C:
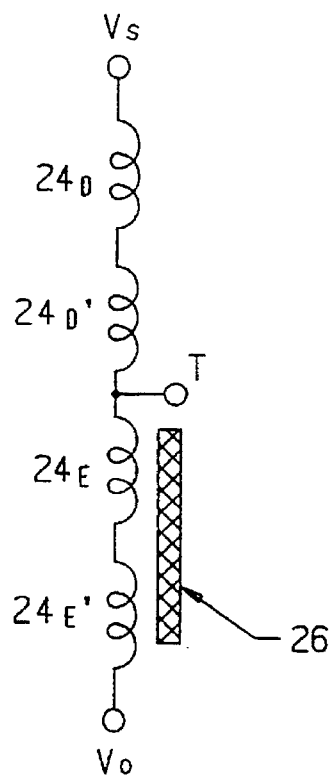

While FIG. 1 shows a stator with symmetrical pole arcs, this is not essential, though in general the two wound poles should be equal in span. For FIG. 1, the full angular range is the 120° span of the wound poles and corresponding cut-out in the rotor, but this range could be slightly increased by increasing the span of the wound poles (comprising stators 24 and coils 25) and decreasing the unwound pole span. For a significantly reduced range requirement, the number of poles can be doubled, as exemplified in the embodiment of FIGS. 3A to 3G, which has six poles of 60° span arranged as two diametrically opposite wound pairs 24D, 24D' and 24E, 24E', and an unwound pair 24F. As shown in FIG. 3B, 26 now has two diametrally opposite cut-outs of 60° span. In the position shown in FIG. 3B, poles 24D and 24D' are uncovered and thus have reduced winding inductance, while 60° rotation clockwise will transfer low inductance to poles 24E and 24E'. With series connection, the centre tap voltage level will be an analogue of 60° travel, but there are two ways of connecting the coils. For simple operation each opposed pair is series connected, giving an output of the form shown in FIG. 3F, analogous to the output shown in FIG. 2. Alternatively, if duplicated outputs are required, pole 24D can be connected in series with 24E only across the supply, and pole 24D' can be similarly connected with pole 24E' across the same or a separate supply, thus giving two centre tap outputs of similar angular analogue form.

Figure 3D:
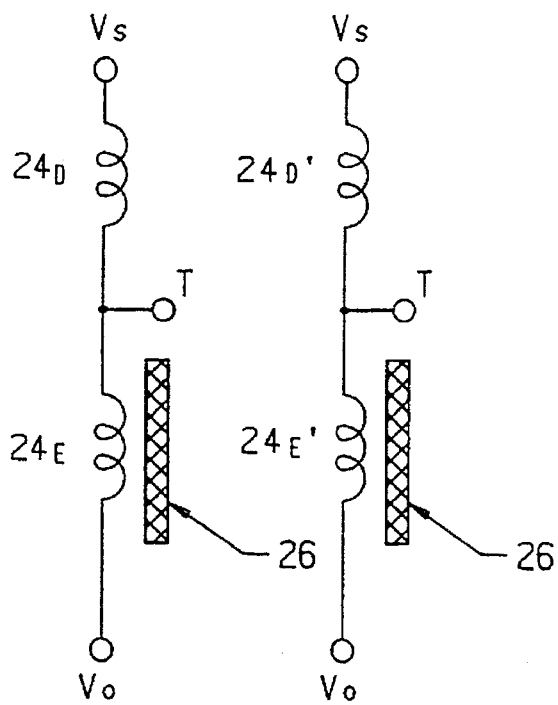
Figure 3E:
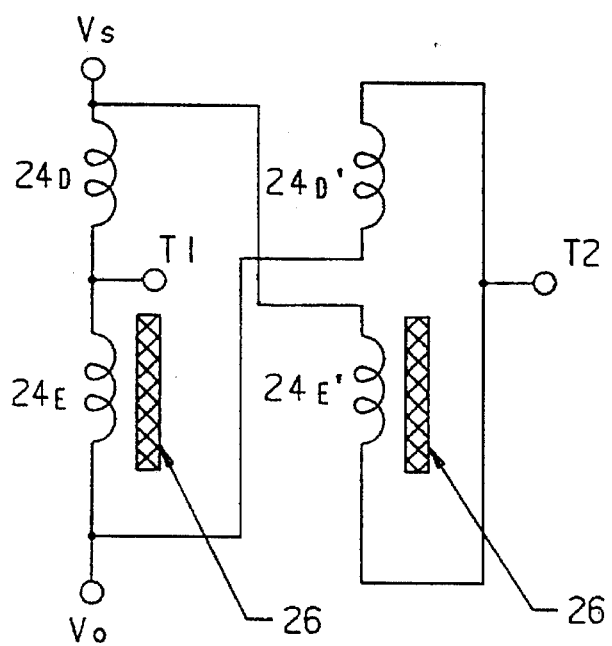
Figure 3F:
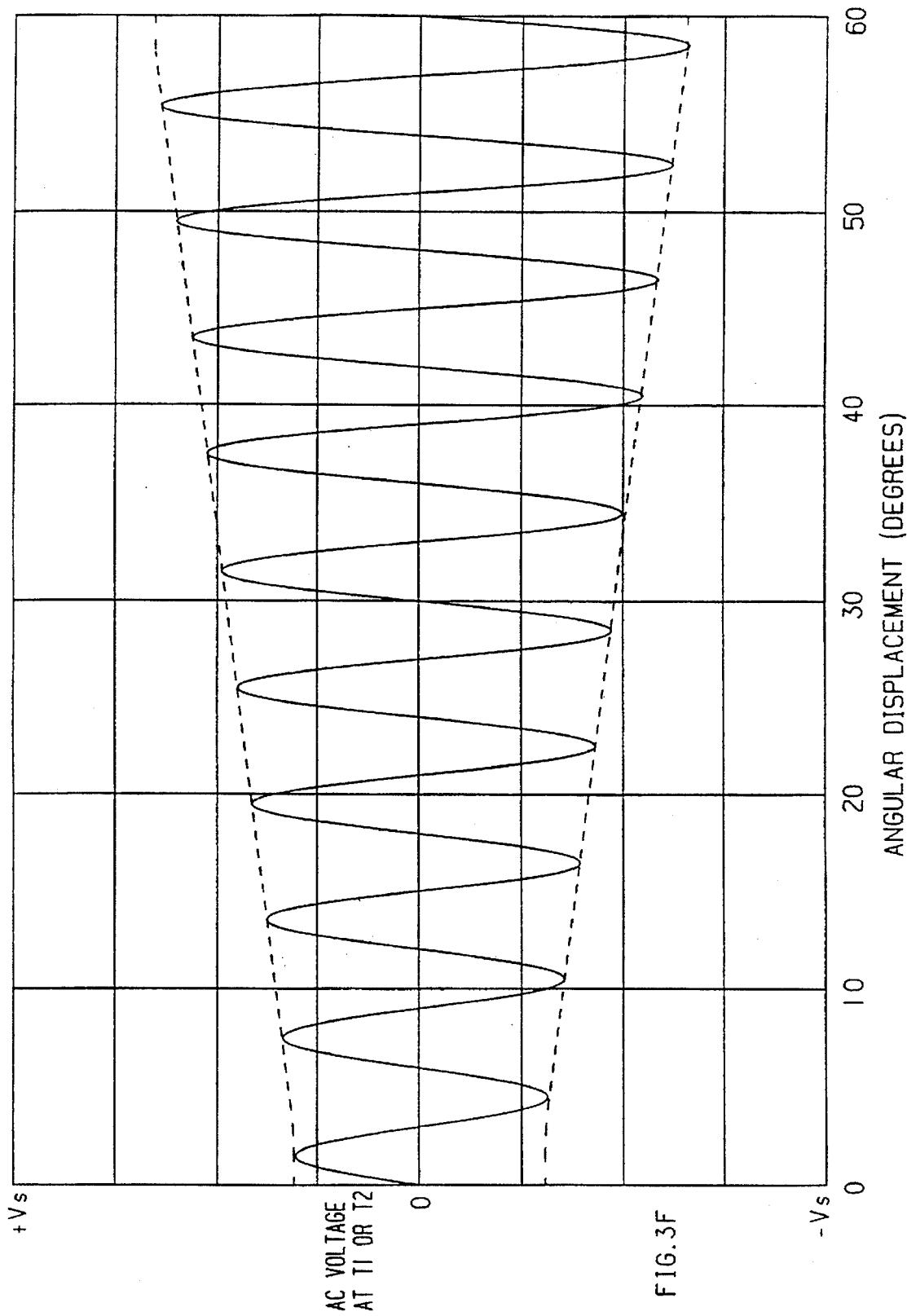
Figure 3G:
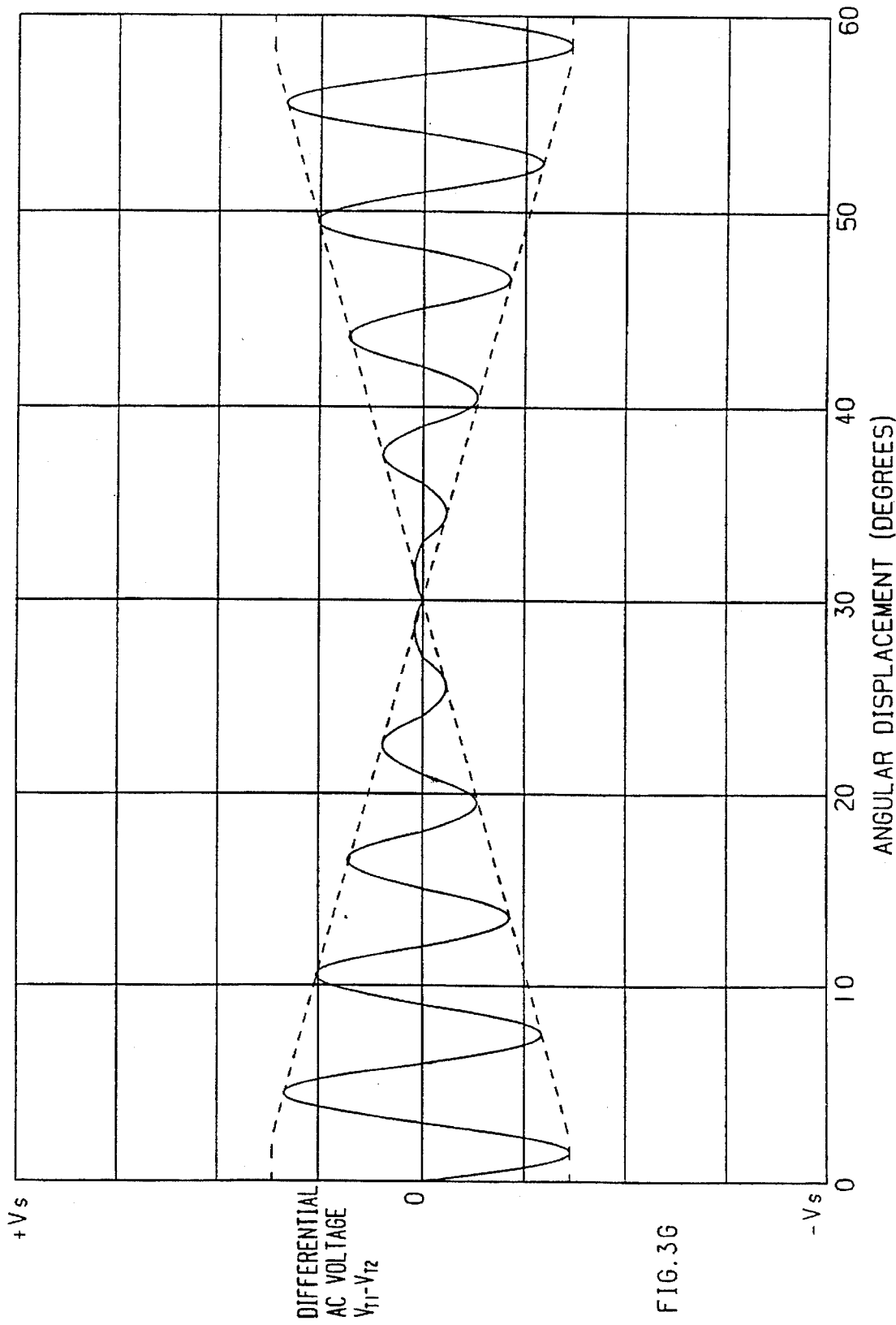

Doubled sensitivity can be obtained by connecting the two sets of windings in FIG. 3D to produce a differential output between the taps, e.g. by reversing the supply connections to coils 24D and 24E', connection being as shown in FIG. 3E and resulting output in FIG. 3G, analogous to FIG. 3F. Phase reversal of the carrier voltage occurs at the mid-point of the angular span, necessitating the use of a synchronous demodulation circuit.

Again, the angular range of 60° can be modified if required by increasing or decreasing the span of the matched wound pole pairs.

It should be noted that while generally linear analogues of angle are depicted, it is possible to modify the shape of the curves if required by changing the shape of the pole surfaces.

An alternative method of changing the inductance of a winding is to interpose a screen of high conductivity material such as non-ferrous metal in the flux path, as described in the referenced patent applications. This is equally applicable to this design. Referring back to FIG. 1A–D, a screen of 120° span in place of the 120° cut-out over pole 14A would reduce its inductance. However, a much greater screening effect is obtainable if there is a ferromagnetic flux path on the other side of the screen, so that flux is forced to try and pass through the screen. FIG. 4A–C shows a preferred arrangement of this type, in which the wound stator 44 (comprising poles 44A, 44B, 44C and coils 45) is faced by a ferromagnetic backing ring 47, the 120° conducting screen rotor 48 being in the air-gap between them. This embodiment includes a housing 41, a shaft 42, and bearing 43 similar to the corresponding parts of the embodiment of FIG. 1. Use of a rotor of the screening type as opposed to the ferromagnetic coupling type gives the designer options in optimising the performance of the sensor under varying specification conditions. For example, high supply frequencies may suit screening, while lower frequencies may be better served by ferromagnetic coupling.

Exactly the same considerations apply with respect to other angular range requirements as for the ferromagnetic coupled design. In FIGS. 3A to 3E, the corresponding screening rotor would present two diametrically opposed blades of 60° span in place of the corresponding cut-outs over poles 24D and 24D'.

It is also practicable to combine ferromagnetic coupling and non-magnetic screening elements in the rotor to increase sensitivity, by incorporating high conductivity screening material in the ferromagnetic rotor cut-outs shown over poles 24D and 24D'.

Figure 5:
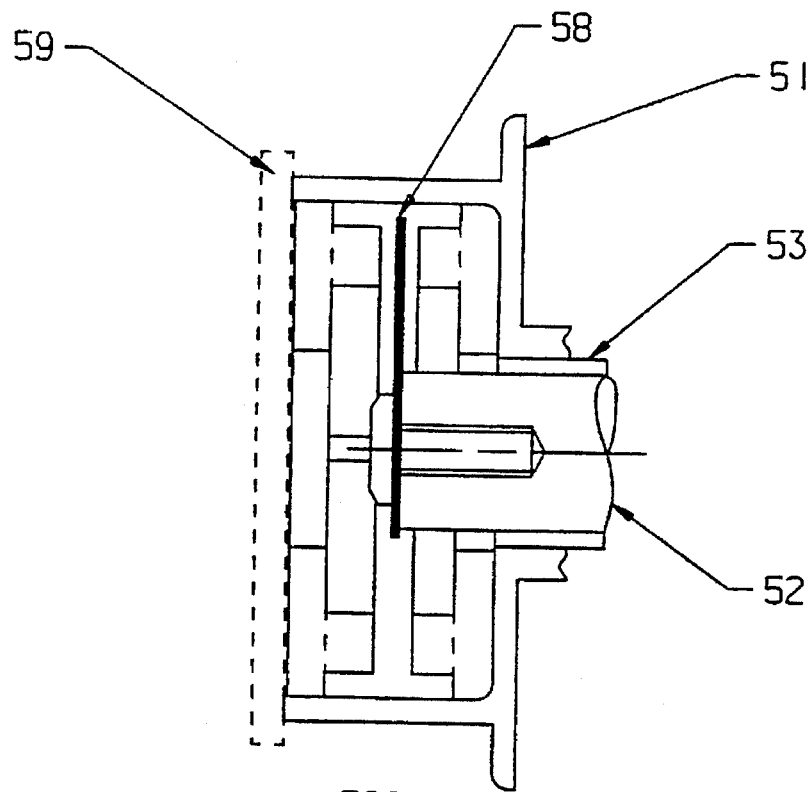
FIG. 5 is a view corresponding to FIGS. 1A and 4A but showing a fourth embodiment.

For maximum sensitivity in terms of signal change per degree, the double-sided stator arrangement of FIG. 5 may be utilised. This embodiment includes a housing 51, a shaft 52 and bearing 53 similar to the corresponding parts of the embodiment of FIG. 1. Thus the stator 54 is duplicated each side of the rotor blade 58, which may be of ferromagnetic flux coupling material or of non-magnetic screening metal as required. This has the production advantage of using double the quantity of the same stator component, rather than two different ones like components 44 and 47 in FIG. 4. The stator windings are then arranged to produce flux in the same direction across the air-gap at any pole, making the sensor relatively tolerant of small axial location variations due to end-float of the shaft in its bearings. The coils on the two stator halves can be series connected as one auto-transformer, or as two separate auto-transformers to provide a duplicate or differential output for maximum sensitivity. The stator pole layout may be of any of the foregoing types.

Figure 6:
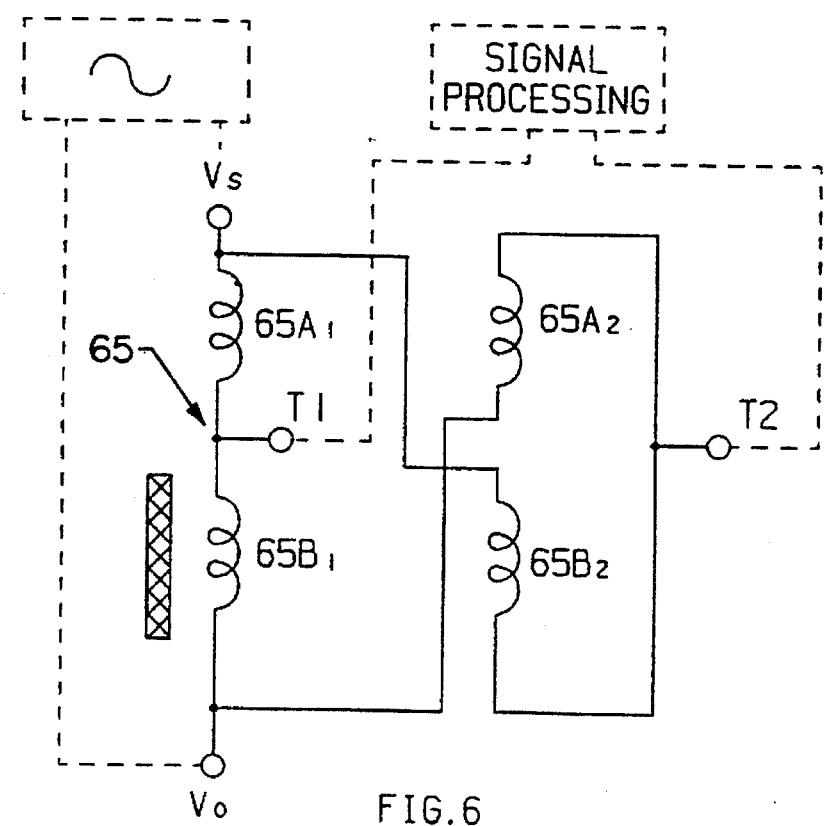
FIG. 6 corresponds to FIG. 1D but shows a fifth embodiment having an alternative connection mode.

The increased sensitivity conferred by differential connection of two sets of wound poles, already described in relation to FIGS. 3, 4 and 5 can be achieved using a single pair of wound poles with bifilar windings. FIG. 6 shows how this may be obtained with a single stator of the FIG. 1B type. Winding 65 comprises coils 65A and 65B around poles 14A and 14B respectively. Coil 65A is bifilar wound to produce two windings $65A_1$ and $65A_2$ of identical turns and impedance, and 65B similarly divided into $65B_1$ and $65B_2$.

Figure 7:
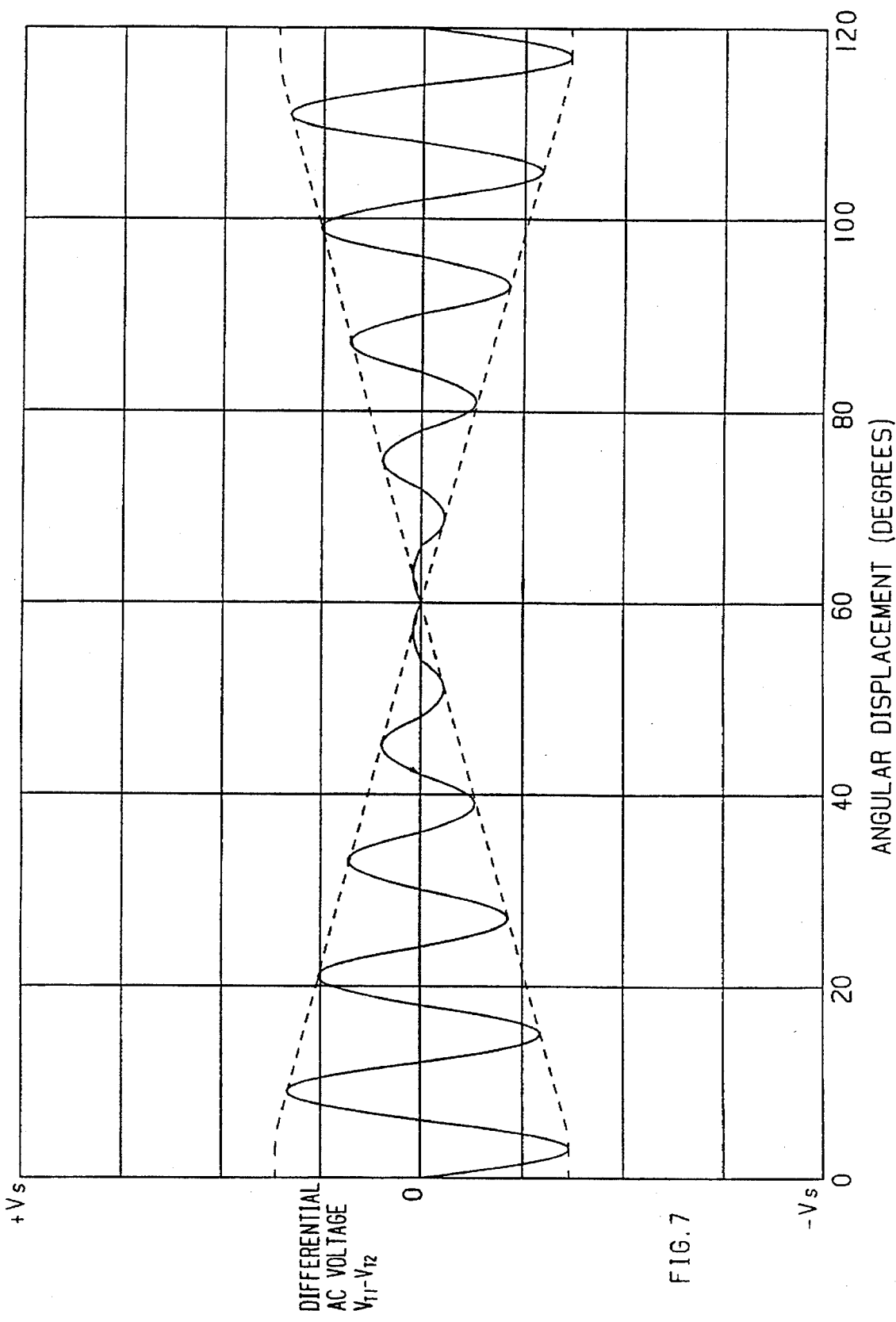
FIG. 7 is a graph analogous to that of FIG. 2 for the embodiment of FIG. 6.

$65A_1$ and $65B_1$ are connected in series between supply terminals Vs and Vo as shown, with a centre tap T1. $65B_2$ and $65A_2$ are similarly series connected, with centre tap T2. It will be clear that reducing the inductance of 65A relative to 65B will cause the voltage level at T1 to rise towards Vs while the level at T2 falls towards Vo, and vice-versa, so that the change in output voltage per degree of rotation between taps T1 and T2 will be the sum of two as shown in FIG. 7, analogous to FIG. 3F.

In all connection diagrams, where the a.c. supply is shown sourced from a single-ended supply Vs-Vo, the non inverted and inverted supply terminals OSC and OSC of a push-pull oscillator may be substituted, the choice being at the discretion of the designer of the electronic signal processing system.

In all cases, the use of a disc-shaped stator of moulded ferromagnetic material with raised pole faces enables coils to be preformed, then fitted, connected and bonded or encapsulated in place. Termination may conveniently be made to a circuit board positioned as shown at 59 in FIG. 5. In this connection, while it is obvious that the FIG. 1A–D design could be reversed to fit the stator 14 adjacent to the end wall for the housing 11 so that only rotor 16 projects, the terminations would then also have to be inboard, which may not be so convenient.

We claim:

1. An angular displacement sensor having a rotation axis and comprising first and second relatively rotatable components arranged to confront each other axially and to define a rotary configuration; the first said component comprising a ferromagnetic member mounted coaxially with said rotation axis and providing a plurality of poles which are disposed at a respective plurality of positions about the rotation axis and extend towards the second component, said poles having axes which extend in the same direction as the rotation axis; said poles constituting excitation poles and return path poles; said excitation poles being provided with winding coils and having inductances; said return path poles not being provided with winding coils; said second component comprising an inductance affecting component for selectively affecting the inductances of said excitation poles which is constructed and arranged so as to overlie only some of the excitation poles at any given time to define poles which are overlaid, the relative rotation varying the poles which are overlaid; the sensor further including means for providing output signal data related to the inductances of the excitation poles and thus related to the rotary configuration of the components.

2. An angular displacement sensor according to claim 1 wherein said second component comprises a ferromagnetic element.

3. An angular displacement sensor according to claim 1 wherein said second component comprises a conductive screening plate for selectively screening said excitation poles.

4. An angular displacement sensor according to claim 3 further including a ferromagnetic backing plate, said screening plate being disposed between said backing plate and said first component.

5. An angular displacement sensor according to claim 1, wherein said second component is a disc of ferromagnetic material and conductive screening material.

6. An angular displacement sensor according to claim 1 wherein the excitation poles are of equal angular extent and carry equivalent coils.

7. An angular displacement sensor according to claim 1 wherein there are four winding coils, the four winding coils forming a first pair and a second pair with the coils of each pair being connected in series, and the first and second pairs being in parallel, such as to provide a differential output between tapping connections corresponding to the connections of the coils of each pair.

8. A rotary device having a housing, a rotatable shaft extending within the housing, and an angular displacement sensor having a rotation axis and comprising first and second relatively rotatable components arranged to conform each other axially and to define a rotary configuration; the first said component comprising a ferromagnetic member mounted coaxially with said rotation axis and providing a plurality of poles which are disposed at a respective plurality of positions about the rotation axis and extend towards the second component, said poles having axes which extend in the same direction as the rotation axis; said poles constituting excitation poles and return path poles; said excitation poles being provided with winding coils and having inductances; said return path poles not being provided with winding coils; said second component comprising an inductance affecting component for selectively affecting the inductances of said excitation poles which is constructed and arranged so as to overlie only some of the excitation poles at any given time to define poles which are overlaid, the relative rotation varying the poles which are overlaid; the sensor further including means for providing output signal data related to the inductances of the excitation poles and thus related to the rotary configuration of the components, said angular displacement sensor having at least a part thereof mounted within the housing, and one of said first and second relative rotatable components being rotationally coupled to the shaft.

* * * * *

UNITED STATES PATENT AND TRADEMARK OFFICE
CERTIFICATE OF CORRECTION

PATENT NO.   : 5,637,997
DATED        : June 10, 1997
INVENTOR(S)  : HORE et al.

It is certified that error appears in the above-indentified patent and that said Letters Patent is hereby corrected as shown below:

On the title page;

[73] Assignee:   Regal Components AB
                 Uppsala, SWEDEN

Signed and Sealed this

Twenty-first Day of September, 1999

Attest:

Q. TODD DICKINSON

*Attesting Officer*       *Acting Commissioner of Patents and Trademarks*